May 7, 1963 L. TRITSCH 3,088,848
PRESSURE-SENSITIVE ADHESIVE TAPE HAVING A MOLECULARLY
ORIENTED FILM BACKING COMPRISING A BLEND OF HIGH
DENSITY AND LOW DENSITY POLYETHYLENES
Filed March 24, 1961
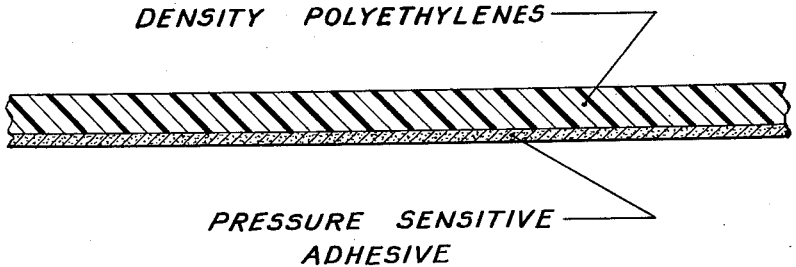
INVENTOR.
Ludwig Tritsch
BY

United States Patent Office 3,088,848
Patented May 7, 1963

3,088,848
PRESSURE-SENSITIVE ADHESIVE TAPE HAVING A MOLECULARLY ORIENTED FILM BACKING COMPRISING A BLEND OF HIGH DENSITY AND LOW DENSITY POLYETHYLENES
Ludwig Tritsch, Wilmette, Ill., assignor to The Kendall Company, Boston, Mass., a corporation of Massachusetts
Filed Mar. 24, 1961, Ser. No. 99,662
4 Claims. (Cl. 117—122)

This invention relates to pressure-sensitive adhesive tapes. In particular, this invention relates to pressure-sensitive adhesive tapes having polymeric film backings comprising molecularly oriented blends of low density polyethylene and high density polyethylene.

It is generally known that ethylene can be polymerized to produce two types of solid ethylene polymers, depending upon the conditions of temperature and pressure, and the nature of the catalyst utilized in the polymerization reaction. The two types of polymers, which have recognizable and considerably different characteristics, are generally referred to as low density polyethylene and high density polyethylene Since the advent of the high density polyethylene, the low density polyethylene is oftentimes referred to as conventional polyethylene. The low density of the conventional polyethylene is usually attributed to the considerable amount of side chain branching existing in the polymer molecules, which also accounts for the non-linearity of the material. On the other hand, the high density polyethylene is characterized by very little side chain branching and exhibits a high degree of linearity. In comparison with the low density polyethylene, the high density polyethylene is harder, stiffer, exhibits higher tensile strength, is less permeable to gas and vapors, is more chemically resistant, and exhibits greater stability at elevated temperatures. Films can be fabricated from both types of polyethylenes. The polymers can be molecularly oriented which, in the case of low density polyethylene films results in desirable properties for many pressure-sensitive tape purposes.

Low density polyethylene generally exhibits a melting point in the range of about 212° to 240° F., has an average density of about 0.92 and side chain branching occurring in the proportion of about 1 side chain per 20 carbon atoms in the main carbon chain. The melting point of high density polyethylene is higher, usually in the range of about 260° to 270° F. It has an average density greater than 0.92, the density ordinarily ranging from about 0.95 to about 0.98 in an annealed state. The occurrence of side chain branching in high density polyethylene is about one-tenth, and less, the side chain branching occurring in low density polyethylene.

Although the excellent combination of over-all properties of tapes made with the conventional or low density polyethylene has resulted in large scale commercial acceptance for numerous uses, these tapes fall short of other desirable requirements. Even though tapes made from the high density or linear polyethylene offer a desirable combination of properties, for example, moisture vapor transmission, low gas permeability and high abrasion resistance, such tapes are deficient in other tape requirements. Thus, the high density molecularly oriented polyethylene films are characterized by a pronounced tendency to split in the direction parallel to the direction of molecular orientation (machine direction). In addition, films of molecularly oriented high density polyethylene have relatively undesirable conformability characteristics for tape purposes, as reflected by their elongation properties in both the machine and transverse directions.

In accordance with the invention it is possible to obtain a unique combination of properties in polyethylene tapes by the proper blending of certain amounts of the high density polyethylene with the low density polyethylene. Moreover, the method of fabricating films from blends of high and low density polyethylene have a distinct influence upon the physical properties of the films. It is known that extruded blends of high density and low density polyethylenes exhibit tensile strengths below the tensile strength of low density polyethylene when such blends contain relatively minor amounts of high density polyethylene. In contrast, differential roll speed calendered films in accordance with this invention exhibit improved tensile strength, even in the case of blends containing minor amounts of high density polyethylene.

It is possible with certain blends of the polymers to obtain improved properties in moisture vapor transmission, gas permeability, abrasion resistance, and resistance to high temperatures. Only certain proportions of the high density polyethylene will give a desired balance of properties without a substantial, deleterious sacrifice of other properties of the tape. In general, the addition of relatively small amounts of high density polyethylene to the low density polyethylene will substantially reduce both moisture vapor transmission and gas permeability. Films made of blends of the high and low density polyethylene exhibit a substantial improvement in abrasion resistance. For example, a calendered film of a molecularly oriented blend of 33 percent high density polyethylene and 67 percent low density polyethylene will have an abrasion resistance of almost twice that of a film composed solely of low density polyethylene.

The tear strength and the elongation properties of the film for pressure-sensitive adhesive tape purposes are important. In many instances a high degree of conformability of the tape is a prime requisite. This property of the tape is reflected by the elongation properties of the film. Preferably the film backing should be capable of elongation in both the machine and transverse directions. Where the degree of conformability required is that suitable for corrosion protective pipe wrap tape purposes, a blend in which the amount of high density polyethylene is less than about 40 percent and normally not more than about 30 percent is preferred. For electrical tape purposes, blends containing about 5 percent to 10 percent high density polyethylene are suitable, particularly when calendered by a differential roll speed calender process to impart substantially monoaxial molecular orientation thereto. Such calendered blends do not suffer from the reduction in tensile strength due to the presence of such small amount of high density polyethylene that has been observed in extruded films, for example. Because of the improved tensile strength of such differential roll speed calendered films it is possible to employ thinner films for greater conformability in electrical tapes. In general, a satisfactory combination of tear strength and elongation properties is obtained with blends containing up to about 50 percent of the high density polyethylene. In the examples described below, a drastic reduction in the percent of elongation is noted as the amount of the high density polyethylene exceeds about 50 percent. At about 50 percent and less of high density polyethylene, the films exhibit suitable tear strength in both directions without splitting of the film. This is illustrated in Table I.

*Table I*

| Percent High Density | Thickness, Mils | Tear Strength Machine | Tear Strength Transv. | Thickness, Mils (a) | Thickness, Mils (b) | Percent Elongation Machine | Percent Elongation Transv. |
|---|---|---|---|---|---|---|---|
| 10 | 6.8 | 48 | 512 | 6.8 | 6.0 | 67 | 240 |
| 20 | 6.7 | 48 | 592 | 6.6 | 6.9 | 67 | 265 |
| 30 | 6.5 | 48 | 352 | 6.3 | 6.4 | 31 | 127 |
| 40 | 6.3 | 48 | 368 | 6.1 | 6.4 | 41 | 8.3 |
| 50 | 6.5 | 48 | 272 | 6.4 | 6.4 | 49 | 5.3 |
| 60 | 5.8 | 32 | Splits | 5.8 | 5.8 | 8.5 | 1.6 |
| 70 | 6.4 | 32 | Splits | 6.5 | 5.7 | 12 | 2.5 |
| 80 | 6.4 | 32 | Splits | 6.3 | 6.3 | 19 | 5 |
| 90 | 6.7 | 32 | Splits | 6.0 | 5.7 | 13 | 4.3 |

(a) Thickness of film measured for elongation in the machine direction.
(b) Thickness of the film measured for elongation in the traverse direction.

The data tabulated in Table I are the relative tear strengths and elongation for various blends of low density and high density calendered films. The first column at the left in Table I, specifies the percentage, on a weight basis, of the high density polyethylene in the blend. As shown in the table, the tear strength in the machine direction of the calendered film remains relatively constant with blends containing up to about 50 percent high density polyethylene. As the amount of the high density polyethylene exceeds about 50 percent, the film will split along the machine direction when an attempt is made to tear the film in a direction transverse to the direction of molecular orientation.

As a general measure of conformability, the elongation data for these films show that the films containing about 40–50 percent of the high density polyethylene have substantially better elongation in the machine direction than do films containing larger amounts of the high density material. The elongation data also show that films containing less than 40 percent high density polyethylene, and normally about 30 percent, are to be preferred in corrosion protective pipe wrap pressure-sensitive tapes. Blends containing less than 10 percent and preferably about 5 percent high density polyethylene offer a higher degree of conformability. Tapes having films of these blends of lower amounts of high density polyethylene afford better conformability because of the combination of suitable elongation in both the machine and transverse directions.

The films specified in Table I were made in the following manner. The solid polyethylene polymers were combined in the specified proportions and milled on a two roll mill. The temperature of the rolls was maintained at above 275° F. with a maximum of about 350° F. Milling was continued for a sufficient length of time to obtain a thorough and homogenous blend of the high and low density polyethylenes. Other methods of compounding the polymers suitable for forming a homogenous blend of the polymers may be used. Each blend of the polyethylenes was then calendered into films on a two roll calender, the blend, in bulk form, being deposited at the nip of the calender rolls adjusted to provide a nip spacing conforming to the particular film thickness desired. The temperature of the top roll was maintained at about 350° F. and the temperature of the bottom roll was maintained at about 210–230° F. A differential speed was maintained between the top and bottom roll to yield a molecularly oriented film in each instance. The data set forth in Table I are representative for films made under the conditions described. Of course, many variations in the calendering operation may be employed. For example, a three roll calender may be used, which would permit higher temperatures to be used in the top and center rolls, the film transferring from the center roll to the bottom roll and strippable therefrom. It should be understood that the values for the tear strength and percent of elongation can be considerably upgraded by other calendering conditions and techniques, but that in general the same relative relationship will exist.

The drawing is a cross-sectional view of an adhesive tape of this invention wherein the tape backing is a film comprising a blend of high density and low density polyethylenes molecularly oriented principally in one direction, that is, substantially monoaxially oriented.

The tear strength values were obtained for the films by following the standaradized method for testing paper, as described in ASTM designation: D689–44. This test determines the average force in grams required to tear a single sheet after the tear has been initiated at one edge thereof. More properly the values obtained from this test are a measure of the internal tearing resistance of the film. In general, the procedure followed was to insert the film into a pair of clamps of the well known Elmendorf tearing tester, one of the clamps being free to move independent of the other. The clamps are held in exact parallel alignment. With the film held in the clamps, the film is cut at the bottom edge of the film in the space between the two clamps. The one clamp is then permitted to swing free in a pendulum action to tear the film along the line initiated by the cut. As indicated in Table I, films containing 50 percent and more of the high density polyethylene split. The split occurs in a direction parallel to the direction of molecular orientation (machine direction), even though the tearing force is applied in a transverse direction. Splitting action of this type should be avoided for pressure-sensitive tape purposes.

The elongation values of Table I are a measure of the degree to which the film will elongate up to the point at which rupture of the film occurs. The films were tested for degree of elongation on an Instron tensile tester. One inch wide samples of the films were clamped in flat faced jaws. The length of the strip of film in each case between the jaws was 6 inches. The crosshead speed was 12 inches per minute. The amount of the elongation of each film at the point of rupture was measured. In each instance, a correction was made for the amount of slippage of the film in the jaws. The amount of elongation, as corrected, is divided by the initial length of the sample to obtain the percent of elongation. On the basis of the results obtained, the preferred films for pressure-sensitive adhesive tapes purposes are those having up to about 30 percent high density polyethylene, in order to obtain the benefit of the combination of conformability in both a transverse and machine direction of the film.

The presence of relatively small amounts of the high density polyethylene when homogeneously blended with the low density polyethylene results in a substantial improvement in the resistance to penetration of the molecularly oriented films at elevated temperatures. Conventional, low density polyethylene will have an elevated temperature penetration value as low as about 60° C. This will vary somewhat, of course, depending upon the conditions under which the low density polyethylene was fabricated. Films calendered under similar conditions exhibit a substantial increase in the elevated temperature penetration, even with a relatively small proportion of high density polyethylene. The degree to which the resistance to penetration increases with relatively low amounts of high density polyethylene is considerably greater than the degree of improvement obtained with higher proportions of the high density polyethylene. Accordingly, it is possible to take advantage of the best combination of tear and elongation properties along with substantial improvement in penetration without resorting to films containing amounts of the high density polymer considerably in excess of 50 percent of the blend. The effect of the concentration of the high density polymer on the penetration at elevated temperatures is illustrated by the data in Table II.

*Table II*

| Percent High Density Polyethylene | 10 | 20 | 30 | 40 | 50 | 60 | 70 | 80 | 90 |
|---|---|---|---|---|---|---|---|---|---|
| Temperature of Penetration, Degree Centigrade | 77 | 87 | 89 | 94 | 95 | 96 | 97 | 98 | 104 |

The elevated temperature penetration test is designed to determine the resistance of the film to penetration at elevated temperatures. The temperatures reported in Table II for the films of the various blends are the temperatures at which the film were penetrated under the test conditions. In general these values were obtained in the following manner. The film of the specified blends were prepared in a manner similar to that previously described; blending was accomplished on a two roll mill and calendered on a two roll calender. Film specimens, each about 5 mils thick, were placed between a steel ball and a steel sheet. The specimen was then accurately heated under a compression load of 1000 grams placed upon the ball. The temperature of the specimen was raised at a uniform rate of 1° C. per 2 minutes until the ball penetrated through the specimen and came into contact with the steel sheet. The temperature at which the contact occurs is the temperature of penetration. This temperature is reported in degrees centigrade. This test procedure is described in detail in Mil-1-7798A, February 24, 1954. As shown in Table II, the elevated temperature penetration value for films containing only 10 percent of the high density polyethylene is about 80° C. In comparison, a similarly calendered low density polyethylene film will have an elevated temperature penetration value of about 60° C. and a high density polyethylene film will have an elevated temperature penetration value of about 108° C. These values, of course, can be upgraded to some extent with different calendering techniques and conditions, but in general the same relative difference will exist.

Differential roll speed calendered films comprising blends of high density polyethylene in relatively minor amounts exhibit tensile strength greater than differential roll speed calendered films of the low density polyethylene itself. This is illustrated in the tensile strength data of a series of blends set forth in Table III below.

*Table III*

| Percent high density: | Tensile strength, p.s.i. |
|---|---|
| 0 | 3198 |
| 5 | 3661 |
| 10 | 4321 |
| 15 | 4750 |
| 20 | 4843 |

Table III sets forth the tensile strength of differentially roll speed calendered films in the machine direction. The low density non-linear polyethylene had a density of about 0.92. The density of the high density linear polyethylene was about 0.96. The blends were milled in the manner heretofore described and then calendered to films approximately 9 to 10 mils thick on a 2 roll calender. The top roll of the calender was heated to a temperature of 340° F. The temperature of the center roll was maintained at a temperature between about 210–260° F. The top roll was stationary and the center roll rotated at a speed to produce the tape at a rate approximately 5 yards per minute. As shown, each of the blends exhibited a tensile strength greater than the tensile strength of the low density polyethylene film (0 percent high density).

Blends of the same high and low density polyethylenes were extruded through a 20 mil orifice onto a flat chilled roll to produce films approximately 10 mils thick. The extruder temperature ranged from 175° to 420° F. The die temperature was about 435° F. The temperature of the stock was about 435° F. The stretch span was about 3 inches. The 100 percent low density polyethylene extruded film exhibited a tensile strength of about 1067 p.s.i. in the machine direction. The extruded film containing 10 percent of the high density polyethylene had a tensile strength of about 858 p.s.i. in the machine direction. The tensile strength of the extruded films containing 20 percent high density polyethylene exceeded the tensile strength of the extruded 100 percent low density polyethylene film.

Thus, differential roll speed calendering improves the tensile strength of blends containing less than 20 percent high density polyethylene. Such calendered films are particularly useful in electrical grade pressure-sensitive adhesive tapes where thin conformable, but strong film backings are required. Relatively high tensile strengths can be obtained with calendered, molecularly oriented films, as compared to films made by other fabrication methods. The calendered, molecularly oriented films made with the blends in accordance with this invention are considerably more resistant to permanent deformation in the machine direction than are other films. This characteristic of high tensile strength is particularly desirable for pressure-sensitive tape applications. The films can be used with various pressure-sensitive adhesive formulations, including formulations based on both synthetic and natural rubber. The adhesive can be applied in the same manner in which they are applied to conventional polyethylene. Conveniently, pressure-sensitive adhesive tapes employing differentially roll speed calendered blends of this invention can be produced in a single-pass calendering operation in the manner shown in U.S. Patent 2,879,547 when the calender rolls at the polyethylene nip are maintained at different speeds.

In general a pressure-sensitive adhesive tape made with films of blends of the high and low density polyethylene containing up to about 50 percent high density polyethylene will have a desirable combination of properties improved over either tapes having 100 percent low density polyethylene film backings or 100 percent high density polyethylene film backings. For the reasons previously stated, the films containing up to about 30 percent to 40 percent of a high density polyethylene are preferred for pressure-sensitive adhesive purposes.

It is to be understood that various embodiments can be made in the invention described herein. Thus, materials normally added to conventional polyethylene, as known in the art, can be compounded with the blends of high and low density polyethylenes to obtain desired modification attributable to these materials. If desired, filler materials and dyes or pigments may be incorporated as desired. Many different changes can be made in the embodiments specifically described in the foregoing disclosure. Such modifications or variations as do not materially affect the essential features of this invention are included in the scope of the following claims.

This application is a continuation-in-part of copending application Serial No. 724,526, filed March 28, 1958, now abandoned.

What is claimed is:

1. A pressure-sensitive adhesive tape comprising a differential roll speed calendered molecularly oriented polyethylene film backing and a pressure-sensitive adhesive mass on at least one side thereof, said backing comprising a blend of high density polyethylene having a density of from about 0.95 to about 0.98 and low density polyethylene having a density of about 0.92 wherein said high density polyethylene is present in an amount from about 5% to less than about 20 percent of the blend.

2. A pressure-sensitive adhesive tape having a differential roll speed calendered molecularly oriented film backing and a pressure-sensitive adhesive mass on at least one side thereof, said backing comprising a blend of about 10 percent high density polyethylene having a density of from about 0.95 to about 0.98 and 90 percent low density polyethylene having a density of about 0.92.

3. A pressure-sensitive adhesive tape having a film backing and a pressure-sensitive adhesive mass on at least one side thereof, said backing comprising a differential roll speed calendered molecularly oriented blend of about 5 percent high density polyethylene having a density of from about 0.95 to about 0.98 and about 95 percent low density polyethylene having a density of about 0.92.

4. A pressure-sensitive adhesive tape having a differential roll speed calendered molecularly oriented polyethylene film backing and a pressure-sensitive adhesive on at least one side thereof, said film backing comprising a blend of a major proportion of a low density polyethylene having a density of about 0.92 and a minor proportion of a high density polyethylene having density of from about 0.95 to 0.98, the proportion of high density polyethylene being at least about 5% but less than that amount which effect is additive to the tensile strength of low density polyethylene in an extruded form of a blend thereof.

References Cited in the file of this patent

UNITED STATES PATENTS

| | | |
|---|---|---|
| 2,631,954 | Bright | Mar. 17, 1953 |
| 2,825,721 | Hogan et al. | Mar. 4, 1958 |
| 2,956,306 | Conwell et al. | Oct. 18, 1960 |

FOREIGN PATENTS

| | | |
|---|---|---|
| 761,723 | Great Britain | Nov. 21, 1956 |
| 790,115 | Great Britain | Feb. 5, 1958 |